US010127896B2

(12) United States Patent
Irisa

(10) Patent No.: US 10,127,896 B2
(45) Date of Patent: Nov. 13, 2018

(54) MUSICAL INSTRUMENT

(71) Applicant: YAMAHA CORPORATION, Hamamatsu-shi (JP)

(72) Inventor: Ayumi Irisa, Hamamatsu (JP)

(73) Assignee: YAMAHA CORPORATION, Hamamatsu-shi (JP)

( * ) Notice: Subject to any disclaimer, the term of this patent is extended or adjusted under 35 U.S.C. 154(b) by 0 days.

(21) Appl. No.: 15/458,182

(22) Filed: Mar. 14, 2017

(65) Prior Publication Data

US 2017/0278493 A1 Sep. 28, 2017

(30) Foreign Application Priority Data

Mar. 22, 2016 (JP) ................................ 2016-056827

(51) Int. Cl.
*G09B 5/00* (2006.01)
*G10D 13/08* (2006.01)
*G10G 5/00* (2006.01)

(52) U.S. Cl.
CPC ............. *G10D 13/08* (2013.01); *G10G 5/005* (2013.01)

(58) Field of Classification Search
CPC ..................................................... G10D 13/08
See application file for complete search history.

(56) References Cited

U.S. PATENT DOCUMENTS 1,369,268 A * 2/1921 Deagan .................. G10D 13/08 84/410
2,020,150 A * 11/1935 Ludwig .................. G10D 13/08 84/403
2,458,193 A * 1/1949 Packheiser ............. G10D 13/08 84/403
2,487,206 A * 11/1949 Zimmerman .......... G10D 13/08 84/403
2,512,777 A * 6/1950 Rest ........................ G10D 13/08 446/420
2,645,970 A * 7/1953 Stabile ................... G10D 13/08 84/402
2,740,314 A * 4/1956 Weinstein .............. G10D 13/08 84/470 R
2,799,198 A * 7/1957 Zimmerman .......... G10D 13/08 84/403
3,174,382 A * 3/1965 Gugelot ................. G10D 13/08 84/404
3,186,290 A * 6/1965 Gould .................. G10D 13/029 84/411 R (Continued)

OTHER PUBLICATIONS

Adams Musical Instruments. "3.0 Octaves, X-Stand & Soundbox." Web. Dec. 2, 2015.

*Primary Examiner* — Robert W Horn
(74) *Attorney, Agent, or Firm* — Rossi, Kimms & McDowell LLP

(57) ABSTRACT

A musical instrument includes an instrument main body extending in a first direction, a first protruding portion that protrudes from one main side of the body, and at least one second protruding from the one main side and spaced from the first protruding portion in a second direction perpendicular to the first direction. The center of gravity of the main body is interposed between the first and second protruding portions in the second direction and located in a region defined by the first and second protruding portions. The region has a polygon shape.

14 Claims, 6 Drawing Sheets

(56) References Cited

U.S. PATENT DOCUMENTS

| | | | | | |
|---|---|---|---|---|---|
| 3,633,453 | A | * | 1/1972 | Musser | G10D 13/08 84/403 |
| 3,742,115 | A | * | 6/1973 | Jakubovicz | G10C 3/06 84/470 R |
| 3,776,091 | A | * | 12/1973 | Suzuki | G10D 13/08 84/402 |
| 3,809,793 | A | * | 5/1974 | Joslyn | G10D 13/08 84/404 |
| 3,858,477 | A | * | 1/1975 | Kawakami | G10D 13/08 84/403 |
| 4,111,094 | A | * | 9/1978 | Broser | G10D 13/08 84/402 |
| 4,137,815 | A | * | 2/1979 | Kloc | G10D 13/08 84/408 |
| 4,848,207 | A | * | 7/1989 | Kawai | G10D 13/08 84/403 |
| 4,885,972 | A | * | 12/1989 | Chen | G10D 13/08 84/403 |
| 5,479,843 | A | * | 1/1996 | Yanagisawa | G10D 13/08 248/187.1 |
| 5,977,465 | A | * | 11/1999 | Piper | G10D 13/08 84/402 |
| 6,362,407 | B1 | * | 3/2002 | Dennis | G10D 13/029 84/411 M |
| 6,376,757 | B1 | * | 4/2002 | Clausen | A47C 9/08 297/186 |
| 6,696,628 | B2 | * | 2/2004 | Yoshida | G10D 13/08 84/321 |
| D609,499 | S | * | 2/2010 | Irisa | D17/23 |
| 7,692,083 | B2 | * | 4/2010 | Aspland | G10D 13/006 84/411 R |
| 7,723,593 | B1 | * | 5/2010 | Prentice | G10D 13/029 84/411 P |
| 8,389,841 | B1 | * | 3/2013 | Stevens | G10D 13/08 84/410 |
| 9,583,081 | B2 | * | 2/2017 | Broadbelt | G10D 13/02 |
| 2015/0187344 | A1 | * | 7/2015 | James | F21V 33/0056 84/411 R |
| 2017/0278493 | A1 | * | 9/2017 | Irisa | G10G 5/005 |

* cited by examiner

MUSICAL INSTRUMENT

CROSS REFERENCE TO RELATED APPLICATION

The present application claims priority from Japanese Patent Application No. 2016-056827, which was filed on Mar. 22, 2016, the disclosure of which is herein incorporated by reference in its entirety.

BACKGROUND

Technical Field

The present disclosure relates to a musical instrument performable in an installed or placed state.

Description of Related Art

Musical instruments such as xylophones and keyboards are played in a state installed or placed on a desk, a stand, or the like. As disclosed in the following Non Patent Literature 1, a foldable stand for xylophones is known. The disclosed stand is formed by four rod members intersecting crosswise and has a substantially X-like shape. The stand is used in a balanced standing state with lower ends of the respective four rod members located at respective different positions on a floor. The stand supports a lower surface (which may be referred to as "installation surface") of the xylophone by upper end portions of the respective four rod members intersecting crosswise.

Non Patent Literature 1:

Adams Musical Instruments, "3.0 Octaves, X-Stand & Soundbox", [online], [retrieved on Dec. 2, 2015], Internet<URL:http://www.adams-music.com/shop/product/detail/?i=Marimba+Academy+Desktop%2C+MSLD30%2C+3.0+okt.%2C+C3-C6%2C+padouk+bars+58-40+mm%2C+X-stand&id=2MBJ2APD30&t=pf&lid=1033>

SUMMARY

In the disclosed stand, a distance between the upper end portions of the rod members that support the xylophone from below is changed by adjusting an angle of the intersecting portion of the rod members. For instance, when the intersecting portion is widened, namely, when the angle of the intersecting portion is increased, the distance between the upper end portions is increased whereas the height of the stand becomes relatively low. On the other hand, when the intersecting portion is narrowed, namely, when the angle of the intersecting portion is decreased, the distance between the upper end portions is decreased whereas the height of the stand becomes relatively high. A user (e.g., a player) of the xylophone adjusts the angle of the intersecting portion of the stand according to the length of xylophone, his/her height, and so on. In an instance where the angle of the intersecting portion is erroneously set or the xylophone is placed on the stand at an inappropriate or erroneous position, there may arise a risk that the xylophone falls down from the stand. Thus, some measures for prevention of inappropriate or erroneous installation are required for such musical instruments.

An aspect of the disclosure provides a musical instrument capable of permitting a user to notice an erroneous or inappropriate installed state of the musical instrument.

The musical instrument includes an instrument main body, a first protruding portion, and at least one second protruding portion. The body extends in a first direction. The first protruding portion protrudes from one main side of the main body and extends in a direction between one end of the main body in the first direction and an opposite end of the main body in the first direction. The at least one second protruding portion protrudes from the one main side and spaced from the first protruding portion in a second direction perpendicular to the first direction, and disposed so that the center of gravity of the main body is interposed between the first protruding portion and the at least one second protruding portion in the second direction.

The first protruding portion and the at least one second protruding portion are disposed so that the at least one second protruding portion and opposite ends of the first protruding portion in the first direction define a first polygon region having a first polygon shape, and the center of gravity is located inside the first polygon region.

The at least one second protruding portion comprises two protruding portions spaced apart from each other in the first direction.

The main body has a front side adjacent where a user of the instrument plays from, and the first protruding portion is disposed farther from front side in the second direction than the at least one second protruding portion.

The main body includes a grip portion provided at one of front or rear side of the main body spaced apart from each other in the second direction, and one of the front or rear side is nearer to the at least one second protruding portion in the second direction.

The center of gravity is disposed within a length of the grip portion in the first direction.

The at least one second protruding portion comprises two protruding portions spaced apart from each other in the first direction, and the grip portion is disposed within the two protruding portions in the first direction.

The first protruding portion and the at least one second protruding portion are respectively disposed a back side and a front side of the main body spaced apart from each other in the second direction.

The main body further includes at least one first-end third protrusion portion and at least one second-end third protrusion. The at least one first-end third protrusion portion is disposed spaced from the first protruding portion and the at least one second protruding portion in the first direction and disposed at the one end of the main body. The at least one second-end third protrusion is disposed spaced from the first protruding portion and the at least one second protruding portion in the first direction at the opposite end of the main body. The distal end of each of the at least one first-end third protrusion portion and the at least one second-end third protrusion portion is disposed further downwardly from the one main side of the main body than a distal end of each of the first protruding portion and the at least one second protruding portion.

The main body further includes at least three third protrusions disposed spaced from the first protruding portion and the at least one second protruding portion in the first direction and at one end portion and an opposite end portion of the main body or on outer sides of the first protruding portion and the at least one second protruding portion in the first direction. The at least three third protruding portions define a second polygon region having a second polygon shape. The center of gravity is located within the second polygon region, and the distal end of each of the at least three third protrusions is disposed further downwardly from the one main side of the instrument main body than a distal end of each of the first protruding portion and the at least one second protruding portion.

The main body is elongated in the first direction.

The main body has a trapezoidal shape.

The first polygon region has a quadrangle shape.

The musical instrument includes at least one row of tone bars disposed on an opposite side of the one main side of the main body.

The musical instrument is a xylophone.

Another aspect is a musical instrument performable in an installed state, including an instrument main body shaped like a plate and extending in a first direction. A first protruding portion protrudes from an installation surface of the instrument main body and extends in a direction from a first end portion of the instrument main body in the first direction toward a second end portion thereof in the first direction. A second protruding portion protrudes from the installation surface and disposed such that a center of gravity of the instrument main body is interposed between the first protruding portion and the second protruding portion in a second direction perpendicular to the first direction, wherein the first protruding portion and the second protruding portion are disposed such that the center of gravity is located in a region defined by a polygon whose apexes correspond to (a) opposite ends of the first protruding portion in the first direction and (b) the second protruding portion.

BRIEF DESCRIPTION OF THE DRAWINGS

The objects, features, advantages, and technical and industrial significance of the present disclosure will be better understood by reading the following detailed description of one embodiment, when considered in connection with the accompanying drawings.

DETAILED DESCRIPTION OF THE EMBODIMENT

Figure 1:
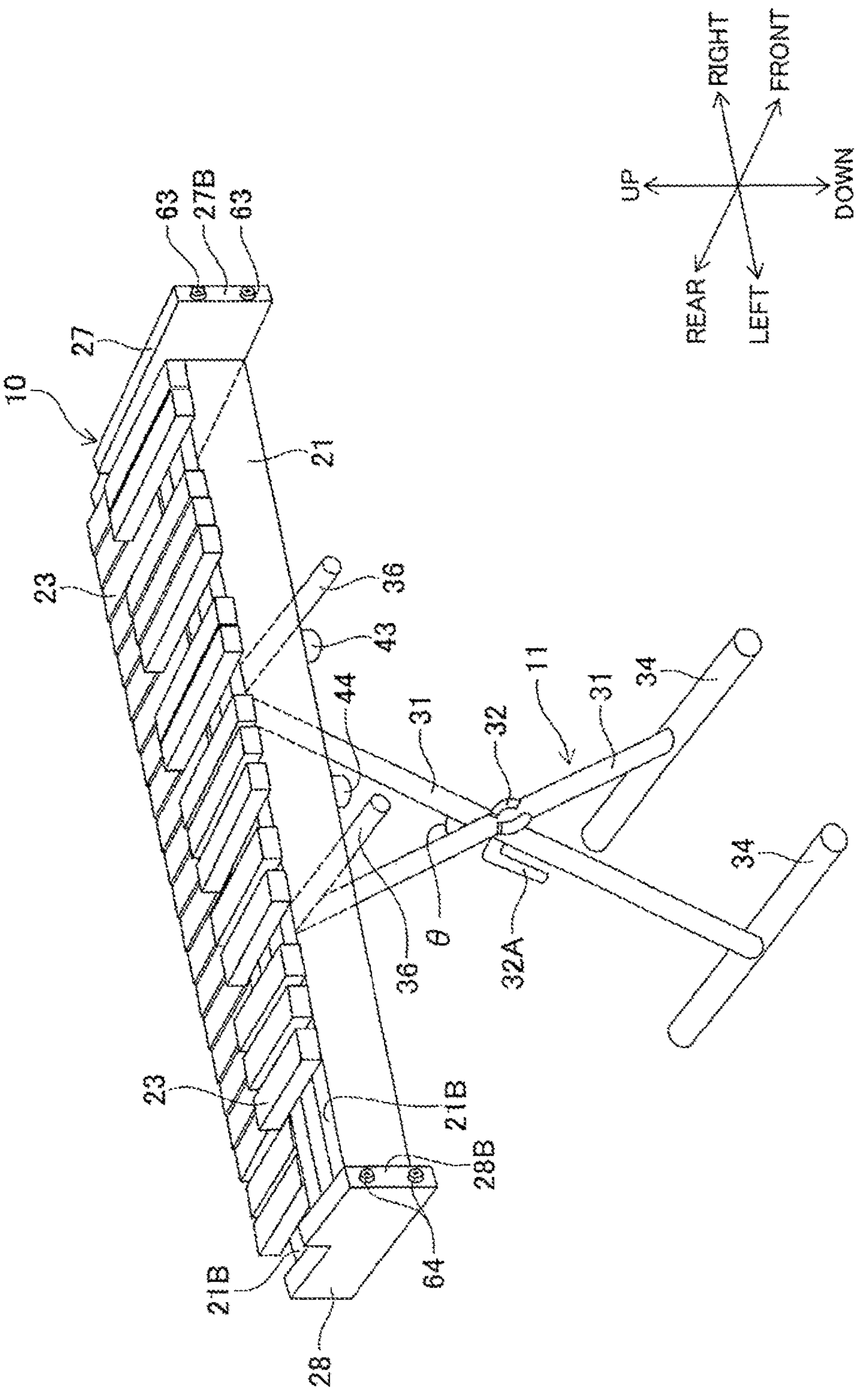
FIG. 1 is a perspective view showing a state in which a xylophone according to one embodiment is set on a stand.
Figure 2:
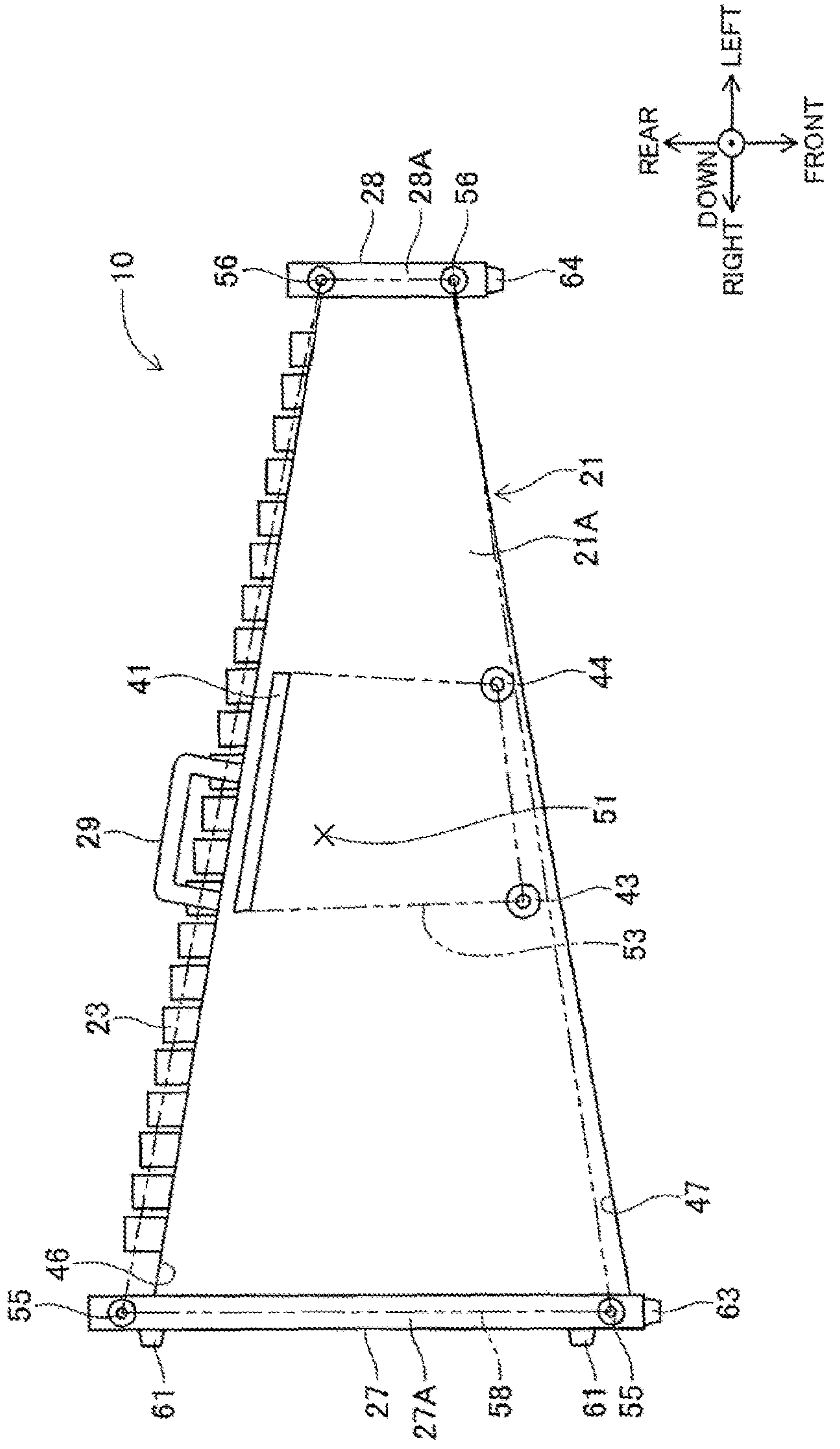
FIG. 2 is a plan view showing a lower surface (installation surface) of the xylophone.

There will be hereinafter described a xylophone, as one example of a musical instrument, according to one embodiment. FIG. 1 shows a xylophone 10 of the present embodiment set or installed on a stand 11. FIG. 2 shows an underside (lower surface) of a bottom board 21A of the xylophone 10. The lower surface may be referred to as an installation surface. The xylophone 10 includes a main body 21, a plurality of tone bars 23, side boards 27, 28. The xylophone 10 is a portable musical instrument, and a user (player) holds a grip 29 (FIG. 2) when carrying the xylophone 10. Although the xylophone 10 of the present embodiment does not include legs and resonator pipes, it may be detachably provided with the legs and the resonator pipes. The xylophone 10 may be a marimba.

The main body 21 is shaped like a plate having a longer dimension in one direction. As shown in FIGS. 1 and 2, a direction in which the main body 21 extends is referred to as “right-left direction”, a direction parallel to the plane of the bottom board 21A and orthogonal to the right-left direction is referred to as “front-rear direction”, and a direction orthogonal to both of the right-left direction and the front-rear direction is referred to as “up-down direction”. Further, the right-left direction of the xylophone 10 of the present embodiment corresponds to a direction orthogonal to the plane of each of the side boards 27, 28, for instance.

The main body 21 is shaped like a plate having a smaller dimension in the up-down direction than in the right-left direction. As shown in FIG. 2, the bottom board 21A which defines the lower surface of the main body 21 has a trapezoidal shape having a dimension (width) in the front-rear direction which gradually increases from the left (the right side in FIG. 2) toward the right (the left side in FIG. 2) when viewed from below. Rails 21B are provided on the bottom board 21A so as to extend upward from an upper surface of the bottom board 21A.

Two pairs of the rails 21B in total are provided, namely, a front-side pair and a rear-side pair. The rails 21B of each pair are opposed to each other in the front-rear direction. Each rail 21B is shaped like a plate having a larger dimension in the right-left direction than in the front-rear direction. The rails 21B of each pair are opposed to each other with a predetermined spacing interposed therebetween in the front-rear direction and extend in the right-left direction.

The front-side pair of the rails 21B are located at a higher level than the rear-side pair of the rails 21B, so as to define a stepped portion which is lower on the rear side than the front side. The tone bars 23 are provided for the two pairs of the rails 21B disposed at different height positions. The tone bars 23 are arranged in the right-left direction at predetermined intervals. The length, the cross-sectional shape and so on of the tone bars 23 are selected such that the tone bars 23 constitute different scales. The length in the front-rear direction of the tone bars 23 in the present embodiment gradually increases from the left to the right, and the scales gradually become lower from the left to the right. For instance, the tone bars 23 corresponding to natural tones, i.e., natural tone bars, are mounted on the rear-side, lower pair of the rails 21B, and the tone bars 23 corresponding to accidental tones, i.e., accidental tone bars, are mounted on the front-side, higher pair of the rails 21B.

The side board 27 is shaped like a plate having a plane extending along the up-down direction and the front-rear direction. The side board 27 is fixed so as to cover a right end face of the bottom board 21A of the main body 21 and right end faces of the respective four rails 21B. The side board 27 has a stepped portion shaped so as to correspond to the stepped portion defined by the two pairs of the rails 21B. Likewise, the side board 28 is shaped like a plate having a plane extending along the up-down direction and the front-rear direction. The side board 28 is fixed so as to cover a left end face of the bottom board 21A and left end faces of the respective four rails 21B. The side board 28 has a stepped portion shaped so as to correspond to the stepped portion defined by the two pairs of the rails 21B. As described above, the dimension (width) in the front-rear direction of the main body 21 is smaller on the left side than the right side. Consequently, the side board 28 on the left side has a smaller dimension in the front-rear direction than the side board 27, in accordance with the shape of the main body 21.

The stand 11 is constituted by two rod members 31 which are intersected crosswise, and the two rod members 31 are connected by an adjuster 32 at the intersected portion. Each of the rod members 31 has a substantially cylindrical shape that is long in one direction. The stand 11 in its opened state has a substantially X-like shape when viewed in the front-rear direction. Legs 34 are fixed to lower end portions of the respective rod members 31 for placing the xylophone 10 on a floor or the like. Each of the legs 34 has a cylindrical shape that is long in one direction and is fixed to the lower end portion of the corresponding one of the two rod members 31, so as to extend in a direction orthogonal with respect to the rod member 31, i.e., the front-rear direction in a state shown in FIG. 1. The stand 11 shown in the state of FIG. 1 stands while kept in balance with the two legs 34 located at different positions on the floor.

Supporters 36 are respectively fixed to upper end portions of the respective rod members 31 for supporting the bottom board 21A of the xylophone 10 from below. Each of the supporters 36 has a cylindrical shape that is long in one direction and is fixed to the upper end portion of the corresponding rod member 31 so as to extend in a direction orthogonal with respect to the rod member 31, i.e., the front-rear direction in the state shown in FIG. 1. The stand 11 supports the xylophone 10 from below with the supporters 36 held in contact with the bottom board 21A of the main body 21.

The adjuster 32 is for changing an angle θ at which the two rod members 31 intersect with each other. The adjuster 32 is configured such that the lock for the two rod members 31 is released by turning a handle 32A. The unlocked two rod members 31 are pivotable stepwise so as to be moved to positions defined by different angles θ. The angle θ is changed by pivoting the two rod members 31 in a direction toward and away from each other. In the thus constructed stand 11, with an increase in the angle θ of the intersecting portion, a distance L1 (FIG. 3) between the two supporters 36 in the right-left direction is increased while a height L2 (FIG. 3) of the stand 11 in the up-down direction is relatively decreased. On the other hand, with a decrease in the angle θ, the distance L1 between the two supporters 36 is decreased while the height L2 of the stand 11 in the up-down direction is relatively increased. When the handle 32A is turned to a lock position, the adjuster 32 fixes the relative position of the two rod members 31. Thus, the user can adjust the angle θ of the stand 11 and the height L2 of the xylophone 10 in accordance with the length of the xylophone 10, his/her height, etc. The shape, structure, etc., of the stand 11 shown in FIG. 1 are examples, and other types of ordinary used stands may be employed as the stand on which the xylophone 10 is set.

As shown in FIG. 2, a first protruding portion 41 and two second protruding portions 43, 44 are provided on the bottom board 21A of the main body 21. The first protruding portion 41 and the second protruding portions 43, 44 protrude downward from the lower surface of the bottom board 21A, in other words, protrude in a direction away from the front surface of the drawing sheet of FIG. 2. The first protruding portion 41 and the second protruding portions 43, 44 support the xylophone 10 when the xylophone 10 is placed with the lower surface of the bottom board 21A facing downward. In view of this, the first protruding portion 41 and the second protruding portions 43, 44 are formed of a material, such as rubber or wood, that allows the main body 21 to be supported from below with high stability.

The first protruding portion 41 has a generally rectangular parallelepiped shape and extends along a rear end portion 46 of the bottom board 21A. The first protruding portion 41 is fixed at a position of the bottom board 21A close to the rear end portion 46 in the front-rear direction. In other words, the first protruding portion 41 is fixed at a position of the bottom board 21A which is located nearer to the rear end portion 46 than a front end portion 47 of the bottom board 21A. The second protruding portions 43, 44 are fixed at respective positions of the bottom board 21A which are located nearer to the front end portion 47 than the rear end portion 46. The rear end portion 46 is one of opposite end portions of the xylophone 10 in the front-rear direction that is nearer, than the front end portion 47, to a side on which a player of the xylophone 10 stands. The front end portion 47 is the other of the opposite end portions of the xylophone 10 that is more distant, than the rear end portion 46, from the side on which the player stands. Each of the second protruding portions 43, 44 is shaped like a truncated cone protruding downward from the lower surface of the bottom board 21A. The second protruding portions 43, 44 are fixed to the lower surface of the bottom board 21A so as to be arranged along the front end portion 47 of the bottom board 21A with a predetermined spacing interposed therebetween. The second protruding portions 43, 44 are fixed at respective positions of the bottom board 21A close to the front end portion 47 in the front-rear direction. As shown in FIG. 2, the second protruding portions 43, 44 are disposed so as to be opposed to the first protruding portion 41 in the front-rear direction. In other words, the second protruding portion 43 is disposed at substantially the same position in the right-left direction as a right end portion of the first protruding portion 41, and the second protruding portion 44 is disposed at substantially the same position in the right-left direction as a left end portion of the first protruding portion 41.

The xylophone 10 has a center of gravity 51 at a position shown in FIG. 2, for instance. The number of the rear-side tone bars 23 (the natural tone bars) is larger than that of the front-side tone bars 23 (the accidental tone bars). Consequently, the center of gravity 51 of the xylophone 10 is shifted or deviates toward the rear side in the front-rear direction. Further, the dimension (width) of the main body 21 in the front-rear direction is larger on its right side than its left side. Consequently, the center of gravity 51 of the xylophone 10 is shifted or deviates toward the right side in the right-left direction.

The center of gravity 51 is located within a region 53 defined by a quadrangle (indicated by the long dashed double-short dashed line in FIG. 2) whose apexes correspond to opposite ends of the first protruding portion 41 in the right-left direction and the two second protruding portions 43, 44. Specifically, the region 53 is a region enclosed by the first protruding portion 41 itself, a straight line that connects the right end of the first protruding portion 41 and the second protruding portion 43, a straight line that connects the left end of the first protruding portion 41 and the second protruding portion 44, and a straight line that connects the two second protruding portions 43, 44. In other words, the first protruding portion 41 and the second protruding portions 43, 44 are disposed such that the center of gravity 51 is located within the region 53. More specifically, the second protruding portions 43, 44 are disposed such that the center of gravity 51 is interposed between the first protruding portion 41 and the second protruding portions 43, 44 in the front-rear direction.

The grip 29 as a grip portion is provided on an end face of the main body 21 facing rearward at the rear end portion 46. The grip 29 has a generally U-like shape when viewed in the up-down direction. The position of the grip 29 in the right-left direction is determined taking account of the position of the center of gravity 51. Specifically, the grip 29 is disposed such that the center of gravity 51 is interposed, in the right-left direction, in an opening portion of the U-shaped grip 29. In other words, the grip 29 is disposed such that the center of gravity 51 is interposed, in the right-left direction, between opposite end portions of the grip 29. With this configuration, the user can carry the xylophone 10 with high stability with the grip 29 held by the user.

The two second protruding portions 43, 44 are disposed such that the grip 29 is interposed therebetween in the right-left direction. Specifically, the second protruding portion 43 is disposed more rightward in the right-left direction than a right end of the grip 29, and the second protruding portion 44 is disposed more leftward in the right-left direction than a left end of the grip 29. With this configuration, the user can lift up the xylophone 10 with both hands such that one hand holds the grip 29 and the other hand supports a portion of the bottom board 21A located between the second protruding portion 43 and the second protruding portion 44 in the right-left direction. Thus, the xylophone 10 can be lifted up with the center of gravity 51 located between both hands of the user, so that the xylophone 10 can be carried with high stability.

Two third protruding portions 55 (each as one example of "first-end protrusion) are provided on a lower surface 27A of the side board 27. The two third protruding portions 55 are fixed at one and the other of opposite end portions of the lower surface 27A in the front-rear direction. The two third protruding portions 55 are disposed on the right side of the first protruding portion 41 and the second protruding portion 43 in the right-left direction at a right end portion (as one example of "first end portion") of the main body 21. Likewise, two third protruding portions 56 (each as one example of "second-end protrusion") are provided on a lower surface 28A of the side board 28. The two third protruding portions 56 are fixed at one and the other of opposite end portions of the lower surface 28A in the front-rear direction. The two third protruding portions 56 are disposed on the left side of the first protruding portion 41 and the second protruding portion 44 in the right-left direction at a left end portion (as one example of "second end portion") of the main body 21. The third protruding portions 55, 56 are shaped like a truncated cone protruding downward from the respective lower surfaces 27A, 28A and formed of rubber or the like. The center of gravity 51 is located within a trapezoidal region 58 (indicated by the long dashed double-short dashed line in FIG. 2) whose apexes correspond to the four third protruding portions 55, 56. In other words, the third protruding portions 55, 56 are disposed such that the center of gravity 51 is located within the region 58.

Two fourth protruding portions 61 are provided on a right end face of the side board 27. The fourth protruding portions 61 are shaped like a truncated cone protruding rightward from the right end face of the side board 27 and are formed of rubber or the like. The two fourth protruding portions 61 are fixed to one and the other of opposite end portions, in the front-rear direction, of the right end face of the side board 27. The two fourth protruding portions 61 are disposed such that the center of gravity 51 is interposed therebetween in the front-rear direction. The fourth protruding portions 61 are used to support the xylophone 10 when the xylophone 10 is leaned against a wall or the like as described below. In view of this, the fourth protruding portions 61 are provided on one of the two side boards 27, 28 opposed to each other in the right-left direction, i.e., the side board 27 toward which the center of gravity 51 is shifted.

As shown in FIG. 1, two fifth protruding portions 63 are provided on a front surface 27B of the side board 27. The two fifth protruding portions 63 are fixed to one and the other of opposite end portions of the front surface 27B in the up-down direction. The fifth protruding portions 63 are shaped like a truncated cone protruding frontward from the front surface 27B. Likewise, two fifth protruding portions 64 are provided on a front surface 28B of the side board 28. The two fifth protruding portions 64 are fixed to one and the other of opposite end portions of the front surface 28B in the up-down direction. The fifth protruding portions 64 are shaped like a truncated cone protruding frontward from the front surface 28B. The fifth protruding portions 63, 64 are formed of rubber or the like. Like the fourth protruding portions 61, the fifth protruding portions 63, 64 are used to support the xylophone 10 when the xylophone 10 is leaned against a wall or the like.

Installed State of Xylophone 10 on Stand 11

There will be next explained an installed state of the xylophone 10. As shown in FIG. 1, the stand 11 supports the xylophone 10 from below such that the first protruding portion 41 and the second protruding portions 43, 44 are interposed between the two supporters 36 in the right-left direction, for instance. In this state, the center of gravity 51 of the xylophone 10 is located between the two supporters 36 in the right-left direction. As described above, the xylophone 10 is asymmetrical with respect to the front-rear direction and the right-left direction. Consequently, it is difficult for the user to recognize, at a glance over an external appearance of the xylophone 10, which portion of the bottom board 21A of the xylophone 10 should be supported by the supporters 36 of the stand 11, thus causing a risk of inappropriately or erroneously install or mount the xylophone 10 on the stand 11.

Figure 3:
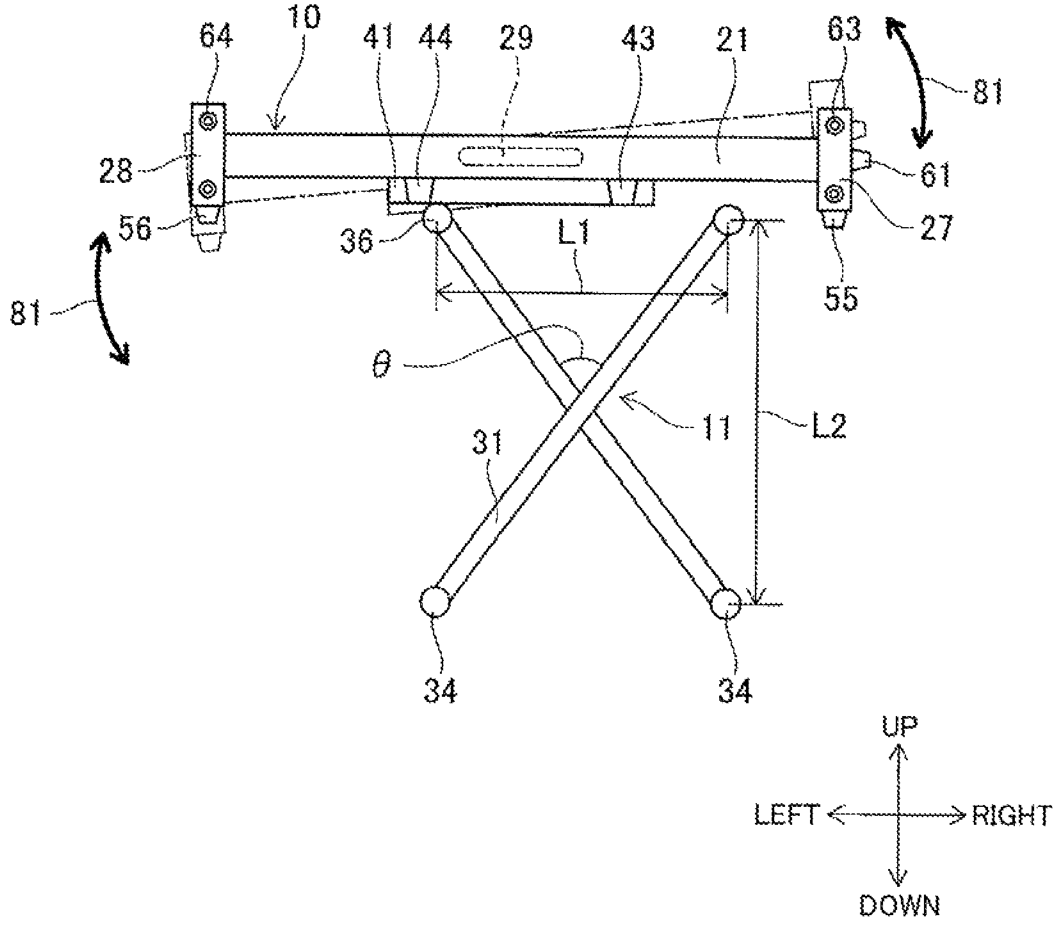
FIG. 3 is a schematic view showing a state in which the xylophone is inappropriately set or installed on the stand.

FIG. 3 is a schematic view of the xylophone 10 and the stand 11 showing a state in which the xylophone 10 is inappropriately installed on the stand 11. For the sake of brevity, the tone bars 23 of the xylophone 10, the adjuster 32 of the stand 11, etc., are not illustrated in FIG. 3. The xylophone 10 of the present embodiment does not have legs and resonator pipes and is portable. The user can carry the xylophone 10 to various sites such as a home, a school, and a concert hall. In this instance, the user sets the xylophone 10 after adjusting the angle θ and the height L2 of the stand 11 or other similar stand. The distance L1 between the two supporters 36 and the angle θ need to be adjusted in accordance with the dimension (the length) of the xylophone 10 in the right-left direction and the position of the center of gravity 51 (FIG. 2). In an instance where the main body 21 is shifted with respect to the supporters 36 in the right-left direction when the xylophone 10 is installed on the stand 11, the xylophone 10 may lose its balance and drop from the stand 11 or the stand 11 may fall down. In the present embodiment, the first protruding portion 41 is disposed at a position at which the first protruding portion 41 comes into contact with the supporters 36 if the xylophone 10 is inappropriately or erroneously installed on the stand 11.

Specifically, the first protruding portion 41 is disposed at a position at which the xylophone 10, if it were not provided with the first protruding portion 41, would lose its balance when the bottom board 21A is supported by the supporters 36 upon installation of the xylophone 10 on the stand 11. In other words, the first protruding portion 41 is provided at a portion of the bottom board 21A that should not be supported by the supporters 36. For instance, the xylophone 10 is installed on the stand 11 at a position at which the first protruding portion 41 comes into contact with one of the two supporters 36, as shown in FIG. 3. If the xylophone 10 does not have the first protruding portion 41, the lower surface of the bottom board 21A is entirely flat. In this case, the user can freely determine the position of the bottom board 21A at which the bottom board 21A is to be supported by the supporters 36 of the stand 11. This is not desirable because the user may have a wrong impression, at the time of installation or for a certain time period after installation, that the xylophone has been appropriately installed. Actually, the position of the center of gravity 51 is, however, shifted with respect to the supporters 36, and there is a risk that, after having been installed, the xylophone 10 loses its balance and drops down from the stand 11 as indicated by an arrow 81 and the long dashed double-short dashed line in FIG. 3.

In contrast, when the xylophone 10 according to the present embodiment is inappropriately installed on the stand 11, the supporters 36 and the first protruding portion 41 come into contact with each other, and the xylophone 10 becomes unstable, namely, wobbles. Thus, the user notices, during the installation operation, that the installed position is inappropriate, owing to the wobbling of the xylophone 10. In this case, the user appropriately installs the xylophone 10 on the stand 11 such that the first protruding portion 41 is interposed between the two supporters 36 in the right-left direction. This configuration prevents the xylophone 10 from dropping and the stand 11 from falling down.

As explained above, the first protruding portion 41 is disposed at a position at which the first protruding portion 41 comes into contact with the supporter(s) 36 when the xylophone 10 is inappropriately installed on the stand 11. For this end, the dimension (length) in the right-left direction of the first protruding portion 41 is set such that the first protruding portion 41 is interposed between the two supporters 36 in a state in which the stand 10 is narrowed to such an extent that the angle θ is minimized within a range in which the xylophone 10 is installable. With this configuration, even when the stand 11 is narrowed to the minimum installable angle θ, the xylophone 10 can be appropriately installed on the stand using the first protruding portion 41 as a guide. Further, if the user narrows the stand 11 beyond the minimum installable angle θ, it becomes impossible to install the xylophone 10 at an appropriate position. Consequently, the user notices the fact that the stand 11 has been narrowed beyond the minimum installable angle θ and is encouraged to always use the stand 10 at an angle not smaller than the minimum installable angle θ.

Figure 4:
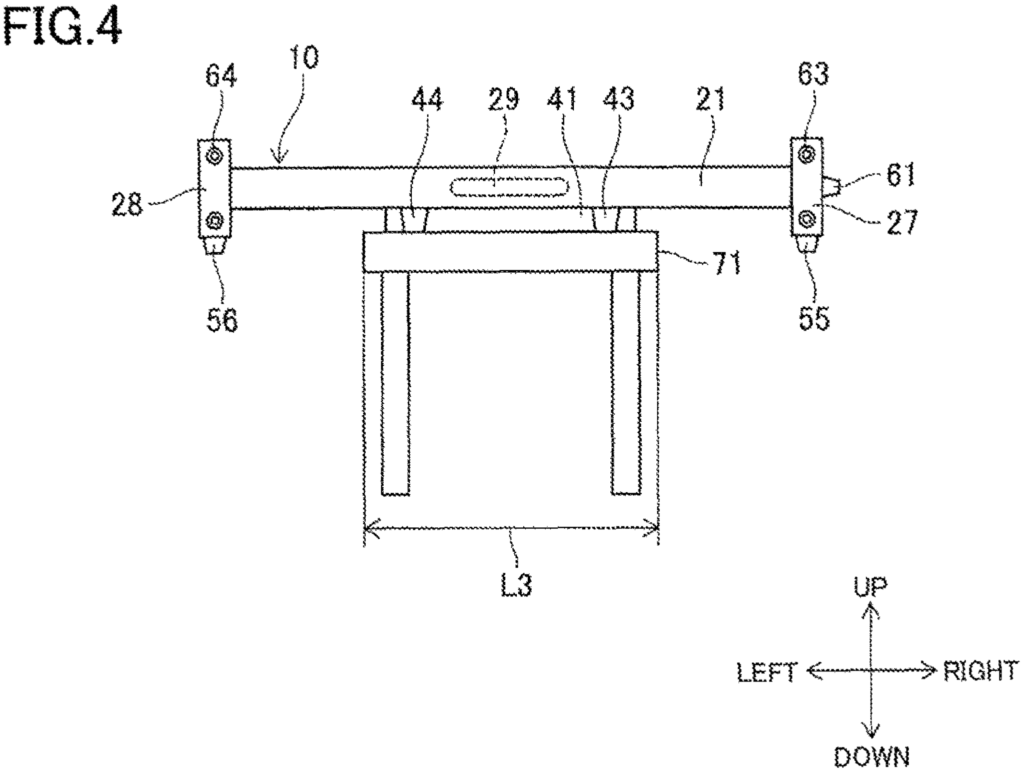
FIG. 4 is a schematic view showing a state in which the xylophone is placed on a desk which is short in a right-left direction.
Figure 5:
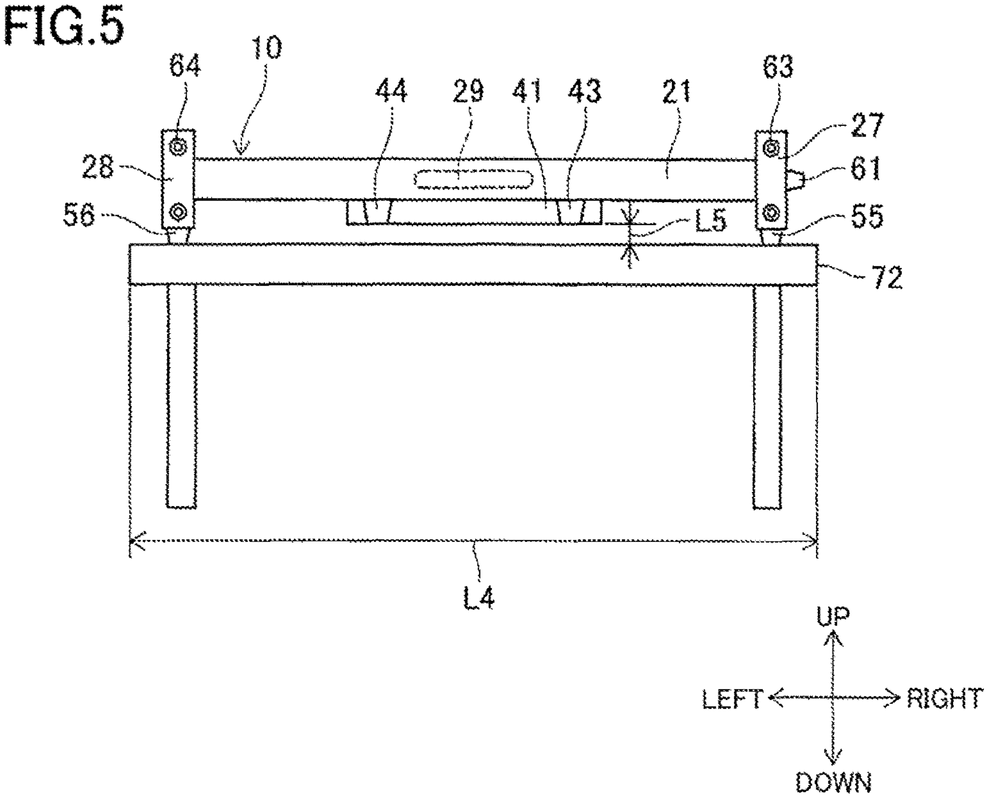
FIG. 5 is a schematic view showing a state in which the xylophone is placed on a desk which is long in the right-left direction.

Cases in which Xylophone 10 is Set on Desks 71, 72 Having Different Lengths Referring next to FIGS. 4 and 5, there will be explained cases in which the xylophone 10 is set on desks 71, 72 having mutually different lengths. FIG. 4 shows a state in which the xylophone 10 is set on a desk 71, and FIG. 5 shows a state in which the xylophone 10 is set on a desk 72. The desk 71 shown in FIG. 4 has a length L3 in the right-left direction shorter than a length L4 of the desk 72 in the right-left direction shown in FIG. 5.

As shown in FIG. 4, the xylophone 10 is placed or set on the desk 71 having the length L3 with the first protruding portion 41 and the second protruding portions 43, 44 held in contact with an upper surface of the desk 71. In this state, the xylophone 10 is supported by the three protruding portions, i.e., the first protruding portion 41 and the second protruding portions 43, 44. As described above, the first protruding portion 41 and the second protruding portions 43, 44 are disposed such that the center of gravity 51 is located in the region 53 shown in FIG. 2. With this configuration, the first protruding portion 41 and the second protruding portions 43, 44 can support, with high stability, the main body 21 from below with respect to the desk 71. Further, the main body 21 does not directly contact the desk 71, whereby the main body 21 is prevented from being damaged. In the xylophone 10 set on the desk 71 shown in FIG. 4, the side board 28 and the side board 27 (the third protruding portions 55, 56) are not in contact with the desk 71.

As shown in FIG. 5, the xylophone 10 is placed or set on the desk 72 having the length L4 with the third protruding portions 55, 56 held in contact with an upper surface of the desk 72. In this state, the xylophone 10 is supported by the four protruding portions, i.e., the two third protruding portions 55 and the two third protruding portions 56. As described above, the third protruding portions 55, 56 are disposed such that the center of gravity 51 is located in the region 58 shown in FIG. 2. With this configuration, the third protruding portions 55, 56 can support, with high stability, the main body 21 from below with respect to the desk 72. In the xylophone 10 set on the desk 72 shown in FIG. 5, the first protruding portion 41 and the second protruding portions 43, 44 are not in contact with the desk 72.

When the xylophone 10 is set on the desk 72, a spacing corresponding to a distance L5 in the up-down direction is left between the desk 72 and distal ends of the respective first protruding portion 41 and second protruding portions 43, 44. In other words, the length of the third protruding portions 55, 56 (including a part of the side board 27 and a part of the side board 28) as measured from the bottom board 21A, namely, a distance between the bottom board 21A and distal ends of the respective third protruding portions 55, 56, is larger than the length of the first protruding portion 41 and the second protruding portions 43, 44 as measured from the bottom board 21A, namely, a distance between the bottom board 21A and distal ends of the respective first protruding portion 41 and second protruding portions 43, 44. The distal ends of the third protruding portions 55, 56 are located lower than the distal ends of the first protruding portion 41 and the second protruding portions 43, 44. Consequently, in a state in which the xylophone 10 is supported by the third protruding portions 55, 56 as shown in FIG. 5, the first protruding portion 41, etc., are prevented from hitting against the desk 72 and the xylophone 10 is accordingly prevented from wobbling.

Placement of Xylophone 10 in Standing Posture

Figure 6:
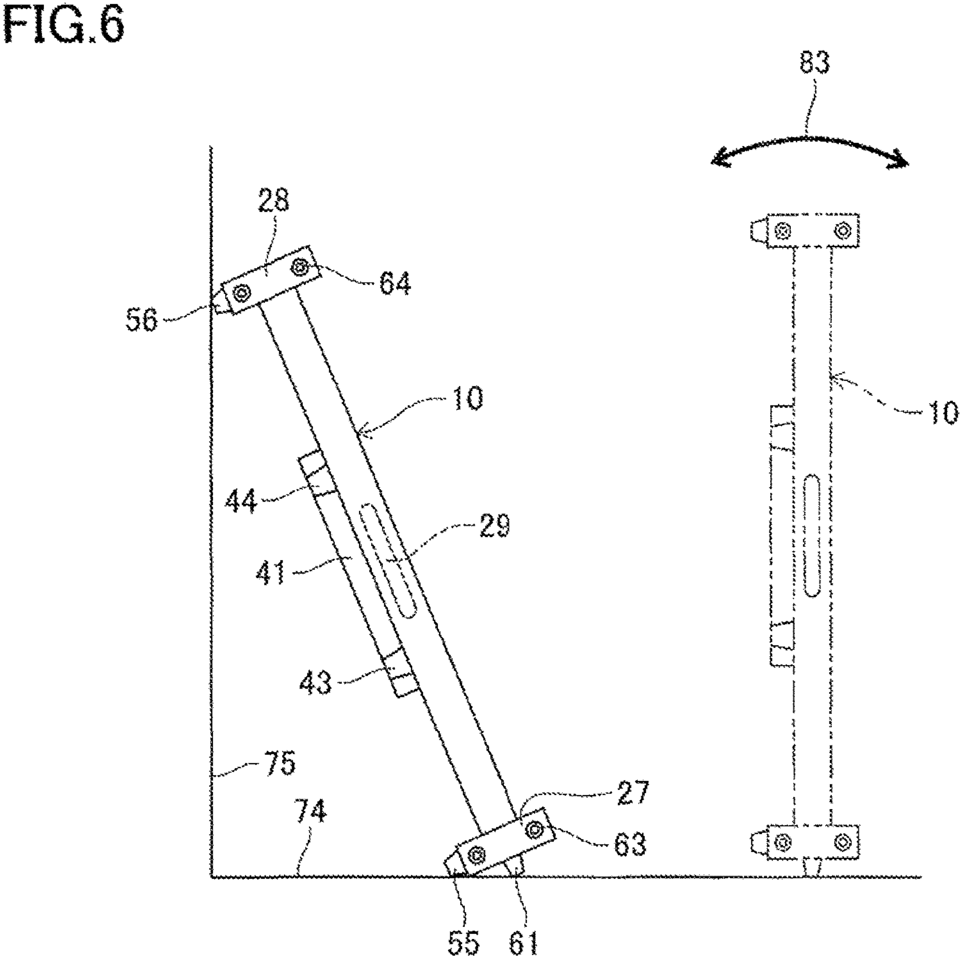
FIG. 6 is a schematic view of the xylophone in a standing posture.

Referring next to FIG. 6, there will be explained a case in which the xylophone 10 is placed in a standing posture. As indicated by the long dashed double-short dashed line in FIG. 6, it is considered that the xylophone 10 of the present embodiment is placed in an upright posture in which the extension direction of the xylophone 10 coincides with the up-down direction, namely, it is considered that the xylophone 10 is placed such that the side board 27 is located at a lower position than the side board 28 so as to be located nearer to the floor 74 than the side board 28. As shown in FIGS. 1 and 2, the xylophone 10, however, has an asymmetrical structure in the front-rear direction and the right-left direction. If the xylophone 10 does not have the fourth protruding portions 61, the side board 27 is flat over its entire surface, and the user may place the xylophone 10 on a floor 74 such that the xylophone 10 stands on the floor 74 with the side board 27 held in contact with the floor 74 over its entire surface. In this case, however, the xylophone 10 tends to fall over toward directions indicated by an arrow 83.

In contrast, the xylophone 10 of the present embodiment has the fourth protruding portions 61 provided on the side board 27, and the xylophone 10 becomes unstable if the xylophone 10 is placed on the floor 74 in the upright posture indicated by the long dashed double-short dashed line in FIG. 6 in which the side board 27 is located lower than the side board 28, namely, located nearer to the floor 74. That is, the xylophone 10 swings in the directions indicated by the arrow 83 if placed on the floor 74 in the upright posture, whereby the user notices that the xylophone 10 should not be placed in the upright posture. Instead of placing the xylophone 10 in the upright posture, the user leans the xylophone 10 on a wall 75 as indicated by the solid line in FIG. 6, for instance. In this instance, the fourth protruding portions 61 provided on the side board 27 are held in contact with the floor 74. Further, the third protruding portions 56 provided on the side board 28 are held in contact with the wall 75. Thus, the side board 27 and the side board 28 do not directly contact the floor 74 and the wall 75 and are accordingly prevented from being damaged.

The xylophone 10 of the present embodiment has the two fifth protruding portions 63 provided on the front surface 27B of the side board 27 and the two fifth protruding portions 64 provided on the front surface 28B of the side board 28, namely, the four fifth protruding portions in total. When the xylophone 10 is placed on the floor 74 with the front surface 27B of the side board 27 and the front surface 28B of the side board 28 facing the floor 74, the xylophone 10 is supported by the four fifth protruding portions 63, 64, so that the xylophone 10 stands on its own with high stability, resulting in a reduction in a storage space for the xylophone 10, for instance.

If it is not desirable to place the xylophone 10 in the posture indicated above in which the xylophone 10 stands with the front surfaces 27B, 28B facing downward because the posture may be unstable, the fifth protruding portions 63, 64 may be utilized for the purpose similar to the fourth protruding portions 61. Specifically, one fifth protruding portion 63 is provided on the front surface 27B, and one fifth protruding portion 64 is provided on the front surface 28B, for instance. In this case, the user notices that the xylophone 10 becomes unstable if the xylophone 10 is placed on the floor 74 with the front surfaces 27B, 28B, each of which has only one fifth protruding portion 63, 64, facing downward. Thus, the user leans the xylophone 10 against the wall 75, for instance, to prevent the xylophone 10 from falling over. The xylophone 10 may have only one fifth protruding portion in total, namely, only one fifth protruding portion 63 or only one fifth protruding portion 64.

In present embodiment, the xylophone 10 is one example of a musical instrument. The main body 21 is one example of an instrument main body. The lower surface of the bottom board 21A is one example of an installation surface. Each of the side boards 27, 28 is one example of the instrument main body. The right-left direction, namely, the direction orthogonal to the plane of each side board 27, 28, is one example of a first direction. The direction parallel to the plane of the bottom board 21A and orthogonal to the right-left direction is one example of a second direction. The opposite end portions of the main body 21 in the right-left direction (the right end portion and the left end portion of the main body 21) respectively contacting the side boards 27, 28 are one example of a first end portion and a second end portion of the instrument main body. The direction along the rear end portion 46 of the bottom board 21A, namely, the direction in which the first protruding portion 41 extends, is one example of a direction along a direction from the first end portion to the second end portion. The embodiment illustrated above offers the following advantageous effects.

<1> The center of gravity 51 of the xylophone 10 is located in the region 53 defined by the quadrangle whose apexes correspond to the opposite ends of the first protruding portion 41 in the right-left direction and the second protruding portions 43, 44. With this configuration, when the xylophone 10 is inappropriately installed on the X-shaped stand 11 at a wrong position, the first protruding portion 41 comes into contact with the supporter(s) 36 of the stand 11, and the xylophone 10 becomes unstable, namely, wobbles, at the time when installed on the stand 11. The unstable state of the xylophone 10 notifies the user of the inappropriate or erroneous installed position, and then the user can appropriately install the xylophone 10 with respect to the stand 11.

<2> The two second protruding portions 43, 44 are arranged along the front end portion 47 of the bottom board 21A with a predetermined spacing interposed therebetween. With this configuration, the user puts his/her hand in the spacing between the two second protruding portions 43, 44 and can support the bottom board 21A at a position near to the center of gravity 51. For instance, when lifting up the xylophone 10 placed on the desk 71 in a state shown in FIG. 4 in which the first protruding portion 41 and the second protruding portions 43, 44 are held in contact with the desk 71, the user can easily lift up the xylophone 10 with his/her hand put in the spacing between the second protruding portions 43, 44.

<3> The grip 29 is provided on the rear end face of the main body 21 at the rear end portion 46 located opposite to the second protruding portions 43, 44 in the front-rear direction. With this configuration, the user supports the bottom board 21A with one hand put in the spacing between the second protruding portions 43, 44 and holds the grip 29 with another hand. In this way, the main body 21 can be stably lifted up from both sides thereof in the front-rear direction. This configuration enables the user to easily install and put away the xylophone 10.

<4> The first protruding portion 41 is fixed at the position of the bottom board 21A close to the rear end portion 46 in the front-rear direction. The second protruding portions 43, 44 are fixed at the positions of the bottom board 21A close to the front end portion 47 in the front-rear direction. When holding the central portion of the xylophone 10 in the right-left direction, the user puts his/her hands respectively from both sides of the bottom board 21A in the front-rear direction. At this time, the hands come into contact with the first protruding portion 41 provided near the rear end portion 46 and the second protruding portions 43, 44 provided near the front end portion 47. Thus, the user can confirm the positions of the first protruding portion 41 and the second protruding portions 43, 44 by the touch of the hands supporting the main body 21 without visually confirming the positions of the first protruding portion 41 and the second protruding portions 43, 44. Thus, the user can appropriately install the xylophone 10 by visually confirming the position of the stand 11 while grasping the positions of the first protruding portion, etc., by the touch of the hands.

<5> The distance between the bottom board 21A and the distal ends of the third protruding portions 55, 56 is larger than the distance between the bottom board 21A and the distal ends of the first protruding portion 41 and the second protruding portions 43, 44, as shown in FIG. 5. With this configuration, in a state in which the xylophone 10 is supported by the third protruding portions 55, 56, the xylophone 10 is free from problems such as wobbling due to contact of the first protruding portion 41 and the second protruding portions 43, 44 with the desk 72, for instance. When the xylophone 10 is played on a relatively short desk, such as the desk 71 of FIG. 4, used in schools, for instance, the xylophone 10 is supported by the first protruding portion 41 and the second protruding portions 43, 44, as shown in FIG. 4. When the xylophone 10 is played on a relatively long desk, such as the desk 72 of FIG. 5, used in concert halls, for instance, the xylophone 10 is supported by the third protruding portions 55, 56, as shown in FIG. 5. By supporting the xylophone 10 using different protruding portions depending on situations, the xylophone 10 can be installed with high stability.

<6> The xylophone 10 has the fourth protruding portions 61 provided on the side board 27. If the xylophone 10 is placed on the floor 74 with the side board 27 facing downward, namely, facing the floor 74, the xylophone 10 becomes unstable (FIG. 6). Thus, the user notices that the xylophone 10 is inappropriately placed and accordingly takes suitable measures such as leaning the xylophone 10 against the wall 75, for instance. Further, because the fourth protruding portions 61 are formed on the side board 27, the side board 27 does not directly contact the floor 74. Consequently, the xylophone 10 is prevented from being damaged.

<7> The two fourth protruding portions 61 are disposed with the center of gravity 51 interposed therebetween in the front-rear direction. With this configuration, the fourth protruding portions 61 are effective not only for notifying the user of an unstable state of the xylophone 10 by contacting the floor 74 but also for stably supporting the xylophone 10 when leaning against the wall 75, so as to prevent the xylophone from falling over in a direction orthogonal to the sheet plane of FIG. 6.

<8> The grip 29 is provided on the rear side of the main body 21, namely, on the side on which the player stands when playing the xylophone 10. Thus, the grip 29 is invisible to an audience present on the front side. The grip 29 is hidden behind the main body 21, contributing to a good appearance of the xylophone 10 as seen from the audience.

<9> In a state in which the xylophone 10 is appropriately set or installed on the stand 11, the first protruding portion 41 and the second protruding portions 43, 44 are located between the two supporters 36 of the stand 11 in the right-left direction. If the position of the xylophone 10 is shifted from its appropriately installed position in the right-left direction, the first protruding portion 41 and the second protruding portions 43, 44 come into engagement or contact with an inside portion of one of the two supporters 36. With this configuration, the first protruding portion 41 and the second protruding portions 43, 44 function as stoppers for stopping the shifting of the xylophone in the right-left direction 10 with respect to the stand 11.

It is to be understood that the present disclosure is not limited to the details of the embodiment illustrated above, but may be modified and changed without departing from the scope of the disclosure defined in the attached claims.

For instance, the positions, the shapes, the sizes, etc., of the first protruding portion 41 and the second protruding portions 43, 44 may be changed otherwise. While, in the illustrated embodiment, the first protruding portion 41 has a shape extending along the rear end portion 46 of the bottom board 21A, a part of the first protruding portion 41 may be curved. Further, the number of the second protruding portions 43, 44 may be one or three or more. In an instance where one second protruding portion 43 is provided, the center of gravity 51 may be located in the region 53 defined by a triangle whose apexes correspond to the one second protruding portion 43 having a truncated conical shape and the opposite ends of the first protruding portion 41. In the illustrated embodiment, the second protruding portions 43, 44 are provided by individual two members. Like the first protruding portion 41, the second protruding portion may be constituted by a single, rectangular parallelepiped member that extends along the front end portion 47 of the bottom board 21A.

In the illustrated embodiment, the first protruding portion 41 and the second protruding portions 43, 44 are separate members from the main body 21, the side board 27, and the like. This is not essential. For instance, the first protruding portion 41 may be formed integrally with the bottom board 21A by making a part of the wooden bottom board 21A into a protruded shape. Each of the fourth protruding portions 61 may be formed such that the flat right end face of the side board 27 has protrusions and recesses. Also in this instance, the side board 27 does not contact the floor 74 over its entire surface, and the xylophone 10 accordingly becomes unstable. Alternatively, each fourth protruding portion 61 may be a semi-spherical member embedded in the side board 27. In the illustrated embodiment, the first protruding portion 41 extends along the rear end portion 46 of the bottom board 21A. This is not essential. The extension direction of the first protruding portion 41 is desirably a direction from the first end portion toward the second end portion which are the opposite end portions of the main body 21. Thus, the first protruding portion 41 may extend in a direction parallel to the right-left direction. The first protruding portion 41 thus formed on the bottom board 21A allows the xylophone 10 to be appropriately installed on the stand 11 and also allows the xylophone 10 to be installed on the desk 71 having a relatively short length.

In the illustrated embodiment, the grip 29 is provided on the end face of the main body 21 facing rearward at the rear end portion 46. The grip 29 may be provided otherwise. For instance, the grip 29 may be provided on a front end face of the main body 21 nearer to the second protruding portions 43, 44. Alternatively, the grip 29 may be provided on both of the end faces in the front-rear direction. The main body 21 is configured not to have the grip 29. The grip 29 may be provided on an upper surface of the main body 21.

In the illustrated embodiment, the first protruding portion 41 is disposed near the rear end portion 46 in the front-rear direction, and the second protruding portions 43, 44 are disposed near the front end portion 47 in the front-rear direction. The first protruding portion 41 may be disposed at a position of the bottom board 21A moved from the rear end portion 46 toward the center of gravity 51.

The musical instrument to which the present disclosure is applied is not limited to the xylophone, but may be percussion instruments having metal tone bars 23, such as glockenspiels and marimbas, or percussion instruments shaped like a rectangular plate extending in one direction, such as keyboards.

The musical instrument having the first protruding portion 41 may be other musical instruments, such as a bass drum, that is placed on a stand or the like when played. In this instance, the bass drum is provided with the first protruding portion 41 that extends on its circumferential surface, for instance. With this configuration, in an instance where the bass drum is inappropriately installed at a wrong position of the stand, the bass drum wobbles and the user accordingly notices the erroneous installation and takes suitable measures, as in the illustrated embodiment.

In the illustrated embodiment, the distance between the bottom board 21A and the distal ends of the third protruding portions 55, 56 is larger than the distance between the bottom board 21A and the distal ends of the first protruding portion 41 and the second protruding portions 43, 44. The position of the distal ends of the third protruding portions 55, 56 and the position of the distal ends of the first protruding portion 41 and the second protruding portions 43, 44 may be the same in the up-down direction. That is, the distance L5 in FIG. 5 may be made equal to zero. Further, the position of the distal end of the first protruding portion 41 and the position of the distal ends of the second protruding portions 43, 44 may be mutually different in the up-down direction.

In the illustrated embodiment, the third protruding portions 55 are constituted by the respective two protrusions, and the third protruding portions 56 are constituted by the respective two protrusions. This is not essential. For instance, the third protruding portion 55 may be constituted by a single protrusion extending in the front-rear direction and disposed at the right end of the main body 21, namely, disposed on the side board 27, and the third protruding portion 56 may be constituted by a single protrusion extending in the front-rear direction and disposed at the left end of the main body 21, namely, disposed on the side board 28. The thus constituted third protruding portions 55, 56 enable the xylophone 10 to be stably placed on the desk.

The xylophone 10 may be configured not to have at least one of the third protruding portions 55, 56, the fourth protruding portions 61, and the fifth protruding portions 63, 64.

In the illustrated embodiment, the xylophone 10 is set or placed on the stand 11 and the desks 71, 72. The xylophone 10 may be set on a stand for the percussion including urethane at its portion on which the xylophone 10 is to be set.

In the illustrated embodiment, the shapes of the stand 11 and the desk 71 are examples, and the xylophone 10 may be placed on the stand 11 shaped otherwise. For instance, while the supporters 36 of the stand 11 for supporting the xylophone 10 have a cylindrical shape in the illustrated embodiment, the supporters 36 may have a semi-cylindrical shape or a rectangular parallelepiped shape having a flat surface on which the xylophone 10 is placed.

What is claimed is:

1. A musical instrument comprising:

an instrument main body having a first main side extending in a first direction, a second main side opposite the first main side, a first end disposed along one ends of the first and second main sides, and a second end disposed along opposite ends of the first and second main sides;

a single first elongated protrusion protruding from a lower surface of the instrument main body and extending along the first main side of the instrument main body; and at least two second protrusions protruding from the lower surface of the instrument main body and spaced from the single first elongated protrusion in a second direction, which is perpendicular to the first direction, and disposed so that a center of gravity of the instrument main body is interposed between the single first elongated protrusion and the at least two second protrusions in the second direction, the at least two first protrusion being spaced apart from each other in the first direction, wherein the single first elongated protrusion and the at least two second protrusions are disposed so that the at least two second protrusions and opposite ends of the single first elongated protrusion in the first direction define a first polygon region having a first polygon shape, and wherein the center of gravity is located inside the first polygon region.

2. The musical instrument according to claim 1, wherein the at least two second protrusions comprise two protrusions that are spaced apart from each other in the first direction.

3. The musical instrument according to claim 2, wherein:

the first main side of the instrument main body is adjacent to where a user of the instrument plays from, and the single first elongated protrusion is disposed farther from the second main side in the second direction than the at least two second protrusions.

4. The musical instrument according to claim 1, wherein:

the instrument main body includes a grip portion provided at one of the first or second main side of the instrument main body spaced apart from each other in the second direction, and one of the first or second main side is nearer to the at least two second protrusions in the second direction.

5. The musical instrument according to claim 4, wherein the center of gravity is disposed within a length of the grip portion in the first direction.

6. The musical instrument according to claim 5, wherein:

the at least two second protrusions comprise two protrusions spaced apart from each other in the first direction, and the grip portion is disposed within the two protrusions in the first direction.

7. The musical instrument according to claim 1, wherein the single first elongated protrusion and the at least two second protrusions are respectively disposed along the first main side and the second main side of the instrument main body and spaced apart from each other in the second direction.

8. The musical instrument according to claim 1, wherein:

the instrument main body further includes:

at least one first-end third protrusion disposed spaced from the single first elongated protrusion and the at least two second protrusions in the first direction and disposed at the first end of the instrument main body; and at least one second-end third protrusion disposed spaced from the single first elongated protrusion and the at least two second protrusions in the first direction at the second end of the instrument main body, and a distal end of each of the at least one first-end third protrusion and the at least one second-end third protrusion is positioned lower in height than a distal end of each of the single first elongated protrusion and the at least two second protrusions.

9. The musical instrument according to claim 1, wherein:

the instrument main body further includes at least three third protrusions disposed spaced from the single first elongated protrusion and the at least two second protrusions in the first direction and the first end and the second end of the instrument main body or on outer sides of the single first elongated protrusion and the at least two second protrusions in the first direction, the at least three third protrusions define a second polygon region having a second polygon shape, the center of gravity is located within the second polygon region, and a distal end of each of the at least three third protrusions is positioned lower in height than a distal end of each of the single first elongated protrusion and the at least two second protrusions.

10. The musical instrument according to claim 1, wherein the instrument main body is elongated in the first direction.

11. The musical instrument according to claim 10, wherein the instrument main body has a trapezoidal shape.

12. The musical instrument according to claim 2, wherein the first polygon region has a quadrangle shape.

13. The musical instrument according to claim 1, further comprising at least one row of tone bars disposed on an opposite side of the first main side of the instrument main body.

14. The musical instrument according to claim 13, wherein the musical instrument is a xylophone.

* * * * *